United States Patent
Shindo et al.

(10) Patent No.: US 6,998,191 B2
(45) Date of Patent: Feb. 14, 2006

(54) COATING COMPOSITION FOR NEGATIVE ELECTRODE, NEGATIVE ELECTRODE PLATE, METHOD FOR PRODUCING THE SAME, AND SECONDARY BATTERY WITH NONAQUEOUS ELECTROLYTE

(75) Inventors: Tadafumi Shindo, Tokyo (JP); Yuichi Miyazaki, Tokyo (JP)

(73) Assignee: Dai Nippon Printing Co, LTD, Tokyo-To (JP)

(*) Notice: Subject to any disclaimer, the term of this patent is extended or adjusted under 35 U.S.C. 154(b) by 348 days.

(21) Appl. No.: 10/288,837

(22) Filed: Nov. 6, 2002

(65) Prior Publication Data

US 2003/0087152 A1    May 8, 2003

(30) Foreign Application Priority Data

Nov. 8, 2001   (JP) .............................. 2001-343719

(51) Int. Cl.
  *H01M 4/62*  (2006.01)
  *B05D 5/12*  (2006.01)

(52) U.S. Cl. .................. 429/217; 252/182.1; 427/58; 427/331

(58) Field of Classification Search ................ 429/209, 429/212, 217, 232; 252/182.1; 427/58, 427/331
See application file for complete search history.

(56) References Cited

U.S. PATENT DOCUMENTS

| | | | |
|---|---|---|---|
| 6,335,120 B1 * | 1/2002 | Bernard et al. | 429/217 X |
| 6,368,746 B1 * | 4/2002 | Takada et al. | 252/182.1 |
| 6,436,573 B1 * | 8/2002 | Goto et al. | 429/217 |
| 6,489,051 B1 * | 12/2002 | Inoue | 429/212 X |
| 6,759,164 B1 * | 7/2004 | Palazzo et al. | 429/217 |

* cited by examiner

*Primary Examiner*—Stephen J. Kalafut
(74) *Attorney, Agent, or Firm*—Timothy J Keefer; Seyfarth Shaw LLP

(57) ABSTRACT

The present invention provides a coating composition for a negative electrode-active material layer, which comprises an active material for a negative electrode, and two or more rubber base binders selected from rubber base binders having a glass transition temperature of 0 to 120° C. The present invention also provides a negative electrode plate, a method for producing the same and a secondary battery with a nonaqueous electrolyte using the above coating composition.

14 Claims, No Drawings

COATING COMPOSITION FOR NEGATIVE ELECTRODE, NEGATIVE ELECTRODE PLATE, METHOD FOR PRODUCING THE SAME, AND SECONDARY BATTERY WITH NONAQUEOUS ELECTROLYTE

CROSS REFERENCE TO RELATED APPLICATION

This application claims the priority of Japanese patent application serial No. 2001-343719, filed on Nov. 8, 2001.

BACKGROUND OF THE INVENTION

1. Field of the Invention

The present invention relates to a coating material for forming a negative electrode-active material layer of a secondary battery with a nonaqueous electrolyte, a typical example of which is a lithium ion secondary battery; a negative electrode plate produced using this coating material; a method for producing the negative electrode plate; and a secondary battery with a nonaqueous electrolyte, into which the negative electrode plate is incorporated.

2. Description of the Related Art

In recent years, reduction in size and weight of electronic equipment and communication equipment has rapidly been advanced. This advance has also required reduction in size and weight of secondary batteries used as a driving power source for the equipment. For this request, there have been proposed secondary batteries with a nonaqueous electrolyte that have a high energy density and a high voltage, a typical example of which is a lithium ion secondary battery, instead of conventional alkaline batteries.

An electrode plate for a positive electrode (positive electrode plate) of a secondary battery with a nonaqueous electrolyte is produced by using, as a positive electrode-active material, a composite oxide such as lithium manganate or lithium cobaltate, dispersing or dissolving such a positive electrode-active material into a suitable wetting agent (solvent) together with a binder so as to prepare a slurry-form coating composition, and then applying the coating composition onto a collector made of metal foil so as to form a positive electrode-active material layer.

On the other hand, an electrode plate for a negative electrode (negative electrode plate) of a secondary battery with a nonaqueous electrolyte is produced by using, as a negative electrode-active material, a carbonaceous material, such as carbon, which can adsorb cations (for example, lithium ions) released from the positive electrode-active material layer at the time of charging, dispersing or dissolving such a negative electrode-active material into a suitable wetting agent (solvent) together with a binder so as to prepare a slurry-form coating composition, and then applying the coating composition onto a collector made of metal foil so as to form a negative electrode-active material layer.

A terminal for taking out electric current is then fitted to each of the positive electrode plate and the negative electrode plate, and subsequently a separator for preventing a short circuit is sandwiched between the two electrode plates, and wound thereon. Thereafter, the resultant is put into a container filled with a nonaqueous electrolyte solution and then the container is sealed, thereby fabricating a secondary battery.

Regarding the binder for preparing the active material coating solution in the above-mentioned coating type electrode plates, the following are required: 1) The binder is chemically stable against the nonaqueous electrolyte; 2) The binder is not eluted into the electrolyte; and, 3) The binder is dissolved in some solvent, and the resultant solution can be applied to a substrate so as to give a thin layer.

Furthermore, for the applied and dried active material layer, the following are required: 1) The layer has flexibility such that it does not peel, fall away or crack in the battery-fabricating process; and, 2) The layer is superior in adhesiveness to the collector.

In the case where a coating type electrode plate is produced, an active material coating solution is usually applied onto a collector to form a coating layer and then pressing is performed in order to improve the adhesiveness of the active material layer to the collector, the density thereof and the uniformity thereof. However, when press-working such as roll-press or sheet-press is performed, the coating layer may be adsorbed on the press face, that is, a part of the coating layer may be adhered to the press face so as to be exfoliated off from the collector. As a result, an inferior product may be produced. In particular, in the case where a binder with a high tackiness is used in order to give the active material layer exhibiting a sufficient adhesiveness to the collector while reducing the amount of the binder so as not to lower battery performance, the frequency that the active material layer is exfoliated by the press face at the time of the press-working increases. Thus, the yield of batteries deteriorates.

SUMMARY OF THE INVENTION

In light of the above-mentioned situation, the present invention has been made. A first object thereof is to provide a coating composition making it possible to form a negative electrode-active material layer which is superior in flexibility and adhesiveness to a collector, and which is not easily exfoliated by a press face at the time of press-working.

A second object of the present invention is to provide a negative electrode plate which is large in yield and provided with an active material layer superior in flexibility and adhesiveness.

A third object of the present invention is to provide a method for producing a negative electrode plate wherein its active material layer is not easily exfoliated by a press face when the active material layer is press-worked.

A fourth object of the present invention is to provide a secondary battery with a nonaqueous electrolyte which is fabricated using the above-mentioned negative electrode plate.

First, the coating composition for a negative electrode-active material layer (negative electrode coating composition) according to the present invention comprises an active material for a negative electrode, and two or more rubber base binders selected from rubber base binders having a glass transition temperature of 0 to 120° C.

It can be considered that in the case where an active material layer for a battery is exfoliated by a press face at the time of press-working the active material layer, the following requirement 1 or 2 is satisfied:

Requirement 1: (cohesive strength of the active material layer)<(adhesive strength between the press face and the active material layer)

Requirement 2: (adhesive strength between the active material layer and a collector of the battery)<(adhesive strength between the press face and the active material layer)

In order to heighten simply the cohesive strength of the active material layer or the adhesive strength of the active material layer to the collector, it is sufficient to increase the amount of the binder. In this case, it is actually difficult to increase the amount of the binder since the performance of the battery falls to cause trade-off between the performance and workability.

Under such restriction, in order to reduce the exfoliation of the active material layer without increasing the amount of the binder, it is necessary to weaken the adhesive strength between the press face and the active material layer.

Paying attention to the glass transition temperature of rubber base resin, rubber base resin having a low glass transition temperature generally has a tendency of having a high adhesiveness and a high tackiness at room temperature. Contrarily, rubber base resin having a high glass transition temperature does not exhibit tackiness very much at room temperature.

Since roll-press is usually performed at room temperature, the adhesive strength between the press face and the active material layer weakens to decrease the exfoliation of active material layer if a material exhibiting a weak tackiness at room temperature is selected as the binder. The active material layer is heated to room temperature or higher (50 to 140° C.) in a drying hood when the layer is formed; therefore, the finished active material layer comes to have a sufficient cohesive strength or a sufficient adhesive strength to the collector if a material exhibiting sufficient adhesiveness and tackiness at this temperature is selected.

Since the process of forming the active material layer undergoes the above-mentioned temperature conditions, it would be sufficient to use, as the binder in the active material layer, a binder having sufficient adhesiveness and tackiness under temperature conditions for coating and drying and having weak adhesiveness and tackiness in press-working. In the present invention, as a material satisfying such a requirement, a rubber base binder having a glass transition temperature of 0 to 120° C. is used.

By the use of the rubber base binder having a glass transition temperature of 0 to 120° C., a negative electrode-active material layer can be formed which is superior in flexibility and adhesiveness to the collector and does not cause the exfoliation of the active material layer easily by the press face at the time of press-working. It is therefore possible to produce a high-quality negative electrode plate, wherein the active material layer hardly falls away or cracks when a battery is fabricated or inside the fabricated battery, with a high yield.

About the apparent glass transition temperature of the system of mixed rubbers, rough additive property is satisfied. Thus, using this matter in the present invention, two or more rubber binders having a glass transition temperature of 0 to 120° C. are mixed, thereby making it possible to optimize the apparent glass transition temperature of the rubber binders easily and minutely.

The above-mentioned negative electrode coating composition according to the present invention preferably contains the rubber base binders at a ratio of 0.5 to 10% by weight of the amount of ingredients other than a solvent.

In the case where the rubber binders as the binders and a thickener are incorporated into the negative electrode coating composition, the composition preferably contains the rubber base binders at a ratio of 0.5 to 7% by weight of the amount of the ingredients other than the solvent, and further contains the thickener at a ratio of 0.5 to 3% by weight thereof.

As the rubber base binders, combination of two or more styrene-butadiene rubbers are preferably used.

Secondly, the negative electrode plate for a secondary battery with a nonaqueous electrolyte according to the present invention is a negative electrode plate comprising a collector and a negative electrode-active material layer disposed on the collector, wherein a negative electrode-active material layer comprises at least an active material for a negative electrode, and two or more rubber base binders selected from rubber base binders having a glass transition temperature of 0 to 120° C.

The negative electrode plate according to the present invention is a plate produced using the above-mentioned negative electrode coating composition, and is a high-quality negative electrode plate wherein the active material layer does not fall away or crack easily at the time of bending for the fabrication of a battery or after the plate is set in the battery.

The blend ratio of each of the components contained in the negative electrode-active material layer of the negative electrode plate according to the present invention are equal to that in the negative electrode coating composition, which are based on the weight of solid contents.

The negative electrode plate according to the present invention can be press-worked such that the density of the negative electrode-active material layer will be 1.5 g/cc or more.

Thirdly, the method for producing a negative electrode plate for a secondary battery with a nonaqueous electrolyte comprising a collector and a negative electrode-active material layer thereon, is characterized in that the negative electrode-active material layer which is disposed on the collector and comprises an active material for a negative electrode and two or more rubber base binders selected from rubber base binders having a glass transition temperature of 0 to 120° C. is subjected to press-working.

Since this method uses the above-mentioned negative electrode coating composition, the exfoliation of the active material layer is not easily caused when the negative electrode-active material is press-worked. Thus, the yield of the negative electrode plate can be improved.

As the press-working, roll-press is preferably performed. The pressing temperature when the press-working is performed is preferably set to room temperature.

Fourthly, the secondary battery with a nonaqueous electrolyte according to the present invention is provided with the above-mentioned negative electrode plate according to the present invention. In this secondary battery, the active material layer of the negative electrode plate set therein does not fall away or crack easily; therefore, this battery is superior in endurance and can exhibit high battery performance over a long time.

DETAILED DESCRIPTION OF THE PREFERRED EMBODIMENTS

The coating composition for a negative electrode-active material layer (referred to as the "negative electrode coating composition" hereinafter) according to the present invention comprises at least an active material for a negative electrode, and two or more rubber base binders selected from rubber base binders having a glass transition temperature of 0 to 120° C.

The negative electrode plate for a secondary battery with a nonaqueous electrolyte according to the present invention comprises a collector and a negative electrode-active material layer disposed on the collector which is produced using the above-mentioned negative electrode coating composition according to the present invention.

As the negative electrode-active material incorporated in the negative electrode coating composition of the present invention, any material which has been conventionally used as a negative electrode-active material of a secondary battery with a nonaqueous electrolyte can be used. Preferred examples thereof include carbonaceous materials such as natural graphite, artificial graphite, amorphous carbon, carbon black, and materials wherein a different element is added to any one of these materials. In the case where the solvent is an organic, a lithium-containing metal such as metal lithium or lithium alloy is preferably used.

The granular shape of the negative electrode-active material is not particularly limited. Examples thereof include scaly, lump, fibrous, and spherical shapes. In order to disperse the negative electrode-active material homogenously in the coating layer, the negative electrode-active material is preferably in the form of powders having particle sizes within the range of 1 to 100 $\mu$m and an average particle size of about 10 $\mu$m. These raw materials for the negative electrode-active material maybe used alone or in combination of two or more thereof.

In the case where it is necessary to lower the resistance of the active material layer, a conductant agent may be incorporated into the negative electrode-active material. Examples of the conductant agent include acetylene black and Ketjenblack.

The blend ratio of the negative electrode-active material in the coating composition is usually from 90 to 98.5% by weight of blend ingredients other than the solvent (by weight of solid contents). In the case of using the conductant agent, the blend ratio of the negative electrode-active material is a ratio of the negative electrode-active material plus the conductant agent. A preferable range of the blend ratio of the conductant agent in the coating composition is from 0.5 to 30% by weight of the solid contents.

It is necessary that the binder for making the negative electrode-active material into a film is electrochemically stable against the nonaqueous electrolyte solution to be used, does not elute in the nonaqueous electrolyte solution, and can be dissolved or dispersed in some solvent so that the resultant solvent can be thinly applied onto a collector made of metal foil. In the present invention, two or more binders are selected, as the binder for the negative electrode coating composition, from rubber base binders having a glass transition temperature of 0 to 120° C., preferably 0 to 60° C., and more preferably 5 to 30° C. These are combined to be used.

It can be considered that in the case where an active material layer for a battery is exfoliated by a press face at the time of press-working the active material layer, the following requirement 1 or 2 is satisfied:

Requirement 1: (cohesive strength of the active material layer)<(adhesive strength between the press face and the active material layer)

Requirement 2: (adhesive strength between the active material layer and a collector of the battery)<(adhesive strength between the press face and the active material layer)

In order to heighten simply the cohesive strength of the active material layer or the adhesive strength of the active material layer to the collector, it is sufficient to increase the amount of the binder. In this case, however, it is actually difficult to increase the amount of the binder since the performance of the battery falls to cause trade-off between the performance and workability.

Under such restriction, in order to reduce the exfoliation of the active material layer without increasing the amount of the binder, it is necessary to weaken the adhesive strength between the press face and the active material layer.

Paying attention to the glass transition temperature of rubber base resin, a rubber base resin having a low glass transition temperature generally has a tendency of having a high adhesiveness and a high tackiness at room temperature. Contrarily, a rubber base resin having a high glass transition temperature does not exhibit tackiness very much at room temperature.

Since roll-press is usually performed at room temperature, the adhesive strength between the press face and the active material layer weakens to decrease the exfoliation of active material layer if a material exhibiting a weak tackiness at room temperature is selected as the binder. On the other hand, the active material layer is heated to room temperature or higher (50 to 140° C.) in a drying hood when the layer is formed; therefore, the finished active material layer has a sufficient cohesive strength or a sufficient adhesive strength to the collector if a material exhibiting sufficient adhesiveness and tackiness at this temperature is selected.

Since the process of forming the active material layer undergoes the above-mentioned temperature conditions, it would be sufficient to use, as the binder in the active material layer, a binder having sufficient adhesiveness and tackiness under temperature conditions for coating and drying and having weak adhesiveness and tackiness in press-working. In the present invention, as a material satisfying such a requirement, a rubber binder having a glass transition temperature of 0 to 120° C. is used.

That is, by using the rubber base binder having a glass transition temperature of 0 to 120° C. in the present invention, it is possible to form a negative electrode-active material layer which is superior in flexibility and adhesiveness to a collector and does not cause the exfoliation of the active material layer easily by the press face at the time of press-working. It is therefore possible to produce a high-quality negative electrode plate, wherein the active material layer hardly falls away or cracks when a battery is fabricated or inside the fabricated battery, with a high yield. If the glass transition temperature of the rubber base binder is too high, the flexibility and the adhesiveness of the active material layer trend to deteriorate. If the glass transition temperature is too low, the active material layer adheres markedly to the press face at the time of press-working.

The glass transition temperature of the rubber base binder, which is within the range of 0 to 120° C., is desirably optimized dependently on various conditions such as the kind, the particle shape and the particle size of the negative electrode-active material and the conductant agent which are mixed with the rubber base binder, blend ratio between these ingredients, and so on. However, rubber base binders commercially available are not divided on the basis of grades about glass transition temperatures of 0° C. or more. If the commercially available binders are used at they are, the following restriction is imposed: a restriction that a binder product having a glass transition temperature near desired one can be selected only from binders having glass transition temperatures different by intervals of at least 10° C. In order to synthesize a rubber base binder having a desired grade by oneself, costs increase.

Against such problems, in the present invention, the fact that about the apparent glass transition temperature of the system of mixed rubbers, rough additive property is satisfied is used. That is, two or more rubber base binders having a glass transition temperature of 0 to 120° C. are mixed, thereby making it possible to optimize the apparent glass transition temperature of the rubber base binders easily and minutely.

In the case where two or more rubber base binders are mixed, the apparent glass transition temperature thereof can be calculated by multiplying, about each of the mixed rubber based binders, the glass transition temperature thereof by the weight ratio thereof to the total weight (regarded as 1) of all the rubber base binders and then summing the resultant values about all the binders. For example, when a rubber base binder 1 (glass transition temperature: A° C., blend weight: X g), a rubber base binder 2 (glass transition temperature: B° C., blend weight: Y g) and a rubber based binder 3 (glass transition temperature: C° C., blend weight: Z g) are mixed, the apparent glass transition temperature Tg' of the mixture can be calculated from the following equation:

<Calculation Example>

$$Tg'=A\times[X/(X+Y+Z)]+B\times[Y/(X+Y+Z)]+C\times[Z/(X+Y+Z)]$$

By changing the blend ratio between the respective rubber base binders on the basis of this relationship equation, the apparent glass transition temperature can be adjusted to a desired value.

As the rubber base binder having a glass transition temperature within the above-mentioned range, any one selected from rubbers composed of two components, or three or more components, and derivatives thereof can be used. Specific examples thereof include styrene butadiene rubber (SBR), high-styrene rubber (HSR), ethylene propylene rubber (EPDM), butyl rubber (IIR), chloroprene rubber (CR), butadiene rubber (BR), isoprene rubber (IR), and silicone rubber. Specific examples of the rubber derivatives include carboxyl-modified products of the above-mentioned rubbers, hydrogenated products thereof, and 2-vinylpyridine introduced products thereof.

It is allowable to select, from the rubber base binders exemplified above, binders which are of the same system but are in grades different in glass transition temperature (for example, styrene butadiene rubbers in different grades) and mix them; select two or more rubber materials which are of different systems and have different glass transition temperatures (for example, a styrene butadiene rubber and a high-styrene rubber) and mix them; or select three or more rubber materials which are of the same system and different systems (for example, two or more styrene butadiene rubbers in different grades, and a high-styrene rubber) and mix them.

The rubber base binders may be synthesized by any one method selected from emulsion polymerization, solution polymerization and bulk polymerization. As a rubber which can be converted to aqueous emulsion, preferable one in the case of SBR is of the copolymerization ratio of styrene in the range of 5 to 70% by weight, and one in the case of HSR of the copolymerization ratio of styrene in the range of 70 to 95% by weight.

In particular, styrene butadiene rubbers and derivatives thereof, among the above-mentioned rubbers, have necessary and sufficient solvent resistance, flexibility and adhesiveness, and are commercially available as rubbers in the state of aqueous emulsion at a relatively low cost. Thus, they are advantageous in costs. Therefore, it is particularly preferred to select two or more from styrene butadiene rubbers in different grades and the derivatives thereof, and combine them to adjust the apparent glass transition temperature.

In order to improve the binding ability or cohesiveness of an active material layer, it is preferred to incorporate a thickener as a part of binders, together with the above-mentioned rubber base binders, into the negative electrode coating composition of the present invention. Specific examples of the thickener include an ammonium salt of carboxymethylcellulose (CMC), a sodium salt of the same, or polyvinylpyrrolidone.

If necessary, some other binder may be incorporated into the negative electrode coating composition of the present invention as far as the objects of the present invention can be attained. Examples of the other binder include thermoplastic resins such as polyester resin, polyamide resin, polyacrylic acid ester resin, polycarbonate resin, polyurethane resin, cellulose resin, polyolefin resin, polyvinyl resin, fluorine resin and polyimide resin; thermosetting resins such as acrylic resin and urethane resin; ionizing radiation setting resins such as acrylate monomers, acrylate oligomers and mixtures thereof; and mixtures of the above described various resins.

About the blend ratio of the rubber base binders in the coating composition, the ratio of the total weight of all the rubber base binders is usually from 0.5 to 10% by weight, preferably from 2 to 4% by weight of solid contents in the composition. In the case where the thickener is used, it is preferred that the ratio of the total weight of the rubber base binders is from 0.5 to 7% by weight and the ratio of the weight of the thickener is from 0.5 to 3% by weight of the solid contents. If the amount of the thickener is too small, the binding property of the negative electrode-active material layer deteriorates. If the amount of the same is too large, the thickener covers the surface of the active material particles so that battery performance deteriorates. Since the solubility of the thickener in water is not over several percentages, a large amount of water must be added to dissolve the thickener if the amount of the thickener is too large. As a result, the concentration of the solid contents in the coating composition lowers markedly so that a large load is imposed on the application and the drying thereof.

As a solvent for preparing the negative electrode coating composition, an organic solvent such as N-methyl-2-pyrrolidone, toluene, methyl ethyl ketone and mixtures thereof may be used. In particular, by using water as the solvent and further selecting a rubber base binder which can be dispersed into a colloidal state in water, an aqueous emulsion coating solution can be prepared. In the case of using water, ion exchange water is usually used to prevent effect of impurities.

In the case of preparing the aqueous emulsion coating solution, the coating composition for a negative electrode is repelled in the surface of a collector, dependently on the material of the collector or the blend ingredients of the coating composition so that surface quality inferiorities in a pinhole or crater form maybe generated. Thus, a bad effect may be produced on battery performance. In order to prevent such surface quality inferiorities, it is permissible to add a small amount of a solvent which is infinitely miscible with water and has an effect of lowering surface tension, for example, isopropyl alcohol (IPA) to the coating composition. The addition amount of the solvent for lowering surface tension may be several percentages. If the amount is too large, the dispersion stability of the coating composition is damaged.

The solvent ratio in the coating composition is usually from 30 to 60% by weight, preferably from 45 to 55% by weight. The coating composition is prepared into a slurry form. In the case where solvents other than the main solvent, an example of which is the solvent for lowering surface tension, are used, the above-mentioned solvent ratio is the ratio of the sum of the main solvent and the other solvents.

The coating composition for a negative electrode-active material layer can be prepared into a slurry form by putting a negative electrode-active material, two or more rubber base binders, which are appropriately selected, other blend ingredients in a suitable solvent, and mixing and dispersing them by means of a dispersing device such as a homogenizer, a ball mill, a sand mill, a roll mill or a planetary mixer. The coating composition for a negative electrode-active material in an aqueous emulsion form can be prepared by emulsifying two or more rubber base binders, which are appropriately selected, and optional other binders such as a thickener with a solvent made mainly of water, putting the resultant binder emulsion together with a negative electrode-active material and other blend ingredients into a suitable solvent, and then mixing and dispersing them in the above-mentioned dispersing device.

The thus prepared negative electrode coating composition is applied onto a single surface or two surfaces of a collector, which is a substrate, and dried to form a negative electrode-active material layer. As the collector of the negative electrode, a copper foil such as an electrolyzed copper foil or a rolled copper foil is preferably used. The thickness of the collector is usually set to about 5 to 50 $\mu$m.

The method of applying the negative electrode coating composition is not particularly limited, and is suitably a method in which a thick coating layer can be formed, such as a slide die coating, comma direct coating, or comma reverse coating method. In the case where the thickness required for the active material layer is relatively small, gravure coating or gravure reverse coating may be used for the application. The active material layer maybe formed by repeating the application and drying plural times.

In the case where a part of the collector surface is exposed in order to connect a negative electrode plate to a terminal, it is advisable that a portion where the coating composition is not applied is formed by controlling a die head to an area desired to be exposed in the collector surface (area which is required to be a non-applied portion) by intermittent die coating, intermittent comma reverse coating, or the like. Alternatively, an area desired to be exposed in the collector surface (area which is required to be a non-applied portion) is covered with a masking tape or a coating layer having weak adhesiveness, and then the negative electrode coating composition is applied onto the entire surface of the collector and dried. Thereafter, the masking taper or the coating layer is peeled. In this way, a part of the collector maybe exposed. Alternatively, the negative electrode coating composition is applied onto the entire surface of the collector and dried to form an active material layer. Thereafter, the active material layer in an area which is required to be a non-applied portion is impregnated with a material for increasing the cohesive strength of the active material layer, for example, a wax or a thermoplastic resin. Then, the impregnated portion is selectively peeled. In this way, a part of the collector may be exposed.

As a heating source in the drying process, hot wind, infrared rays, microwaves, high-frequency waves, or a combination thereof can be used. The drying may be performed by heat radiated by heating a metal roll or a metal sheet for supporting or pressing the collector in the drying process. By radiating electron beams or radioactive rays after the drying, the binders are caused to crosslink-react so that the active material layer can be obtained. The application and the drying may be repeated plural times.

By press-working the resultant negative electrode-active material layer, the density of the active material layer, the adhesiveness thereof to the collector, and the homogeneity thereof can be improved.

The press-working is performed using, for example, a metal roll, an elastic roll, a heating roll, a sheet-press machine, or the like. In the present invention, the press-working may be performed at room temperature or a raised temperature as far as the press temperature is lower than the temperature for drying the coating layer of the active material layer. The press-working is usually performed at room temperature (typically, 15 to 35° C.).

The roll-press is preferred since a negative electrode plate in a long sheet form can be continuously press-worked. In the case where the roll-press is performed, either regular position press or constant pressure press maybe performed. The line speed in the press is usually set to 5 to 50 m/min. When the pressure of the roll-press is controlled by line pressure, the line pressure, which is adjusted dependently on the diameter of the pressing roll, is usually set to 0.5 kgf/cm to 1 tf/cm.

In the case where the sheet-press is performed, the pressure is usually adjusted in the range of 4903 to 73550 N/cm$^2$ (500 to 7500 kgf/cm$^2$), preferably 29420 to 49033 N/cm$^2$ (3000 to 5000 kgf/cm$^2$). If the press pressure is too small, the homogeneity of the active material layer is not easily obtained. If the press pressure is too large, the electrode plate including the collector may be damaged. The active material layer may be made to have a given thickness by a single press operation. The active material layer may be pressed several times in order to improve the homogeneity thereof.

The coating amount of the negative electrode-active material layer is usually set to 20 to 250 g/m$^2$, and the thickness thereof is usually set to 10 to 200 $\mu$m, preferably 50 to 170 $\mu$m after the layer is dried and pressed. The density of the negative electrode-active material layer is about 1.0 g/cc after the layer is applied, and increases to 1.5 g/cc or more (usually from about 1.5 to 1.75 g/cc) after the layer is pressed. Thus, by performing the press-working without any difficulty to improve the volume energy density, the capacity of the battery can be made high.

The thus obtained negative electrode-active material layer of a negative electrode plate according to the present invention contains at least a negative electrode-active material and two or more rubber base binders selected from rubber base materials having a glass transition temperature of 0 to 120° C., and may further contain, if necessary, a thickener or other ingredients. The blend ratio between the respective ingredients contained in the active material layer after being dried is substantially the same as that of the respective ingredients in the negative electrode coating composition on the basis of solid contents therein.

When the negative electrode plate according to the present invention is used to produce a secondary battery, in order to remove water content from the active material layer before the process of fabricating the battery, it is preferred to subject the negative electrode plate beforehand to ageing such as heating treatment in a vacuum oven or the like or decompression treatment.

The volume energy density of the battery is usually calculated on the basis of the whole of the battery, which includes its positive electrode, negative electrode, separator, packing cane and so on. For reference, however, the volume energy density of only the negative electrode-active material layer is calculated. The calculation is as follows:

(Condition 1) In the case where the density of the coating layer is 1.70 g/cc, the ratio of the active material is 98% by weight and the electric discharge capacity of the negative electrode is 340 mAh/g, volume energy density=1.70 (g/cc)×0.98×340 (mAh/g)= 566.44 (mAh/cc).

(Condition 2) In the case where the density of the coating layer is 1.40 g/cc, the ratio of the active material is 98% by weight and the electric discharge capacity of the negative electrode is 340 mAh/g, volume energy density=1.40 (g/cc)×0.98×340 (mAh/g)= 466.48 (mAh/cc).

In this way, the negative electrode plate for a secondary battery with a nonaqueous electrolyte according to the present invention is obtained. This negative electrode plate is combined with a positive electrode plate to make it possible to produce a secondary battery with a nonaqueous electrolyte.

The electrode plate for a positive electrode (positive electrode plate) is produced by applying a coating composition containing a positive electrode-active material onto a collector to form a positive electrode-active material layer. Examples of the positive electrode-active material include lithium oxides such as $LiMn_2O_4$ (lithium manganate), $LiCoO_2$ (lithium cobaltate) and $LiNiO_2$ (lithium nickelate); and calcogen compounds such as $TiS_2$, $MnO_2$, $MoO_3$ and $V_2O_5$. A lithium base secondary battery giving a high discharging voltage of about 4 V can be obtained, in particular, by using $LiCoO_2$ as the positive electrode-active material and a carbonaceous material as the negative electrode-active material.

In order to disperse the positive electrode-active material homogenously in the coating layer, the positive electrode-active material is preferably in the form of powders having particle sizes within the range of 1 to 100 μm and an average particle size of about 10 μm. These raw materials for the positive electrode-active material may be used alone or in combination of two or more thereof.

As a binder for the positive electrode-active material, a binder that has been conventionally used can be used. Examples of the binder include thermoplastic resins such as polyester resin, polyamide resin, polyacrylic acid ester resin, polycarbonate resin, polyurethane resin, cellulose resin, polyolefin resin, polyvinyl resin, fluorine resin and polyimide resin. At this time, an acrylate monomer or oligomer into which a reactive functional group is introduced can be incorporated into the binder. Besides it is also possible to use rubber base resins, thermosetting resins such as acrylic resin and urethane resin; ionizing radiation setting resins such as acrylate monomers, acrylate oligomers and mixtures thereof; and mixtures of the above described various resins.

As a conductant agent, a carbonaceous material such as graphite, carbon black or acetylene black is used if necessary.

As a solvent for preparing the coating composition for a positive electrode (referred to as the positive electrode coating composition herein after), an organic solvent maybe used, examples of which include toluene, methyl ethyl ketone, N-methyl-2-pyrrolidone, and mixture thereof.

The positive electrode coating composition can be prepared into a slurry form by putting a positive electrode-active material, a binder, and optional other ingredients, as described above, in a suitable solvent, and mixing and dispersing them in the same manner as in the case of preparing the above-mentioned negative electrode coating composition.

When the total weight of the coating solution is regarded as 100 parts by weight, it is preferred to set the total amount of the positive electrode-active material and the binder to about 40 to 80 parts by weight. The blend ratio between the positive electrode-active material and the binder may be similar to the prior art. Preferably, the weight ratio of the positive electrode-active material/the binder is, for example, from about 5/5 to 9/1.

The resultant positive electrode coating composition is applied onto a collector and dried in the same way as in the case of producing the above-mentioned negative electrode plate, whereby a positive electrode plate can be produced. The thickness of the positive electrode-active material layer is usually set to 10 to 200 μm, preferably 50 to 170 μm after the layer is dried and pressed. As the collector of the positive electrode plate, in general, an aluminum foil having a thickness of about 5 to 30 μm is preferably used.

The positive electrode plate and the negative electrode plate produced by the above-mentioned methods are wound into a swirl form with a separator such as a porous film made of polyethylene interposing between them, and the resultant is inserted into a packing container. After the insertion, a terminal connection portion (naked face of the collector) of the positive electrode plate is connected to a positive electrode terminal fitted to the upper face of the packing container by means of a lead. On the other hand, a terminal connection portion (naked face of the collector) of the negative electrode plate is connected to a negative electrode terminal fitted to the bottom face of the packing container by means of a lead. A nonaqueous electrolyte is then filled into the packing container, and the container is sealed, thereby finishing a secondary battery with the nonaqueous electrolyte having the negative electrode plate according to the present invention.

When a lithium base secondary battery is fabricated, there may used a nonaqueous electrolyte wherein a lithium salt, which is a solute, is dissolved in an organic solvent. Examples of the lithium salt include inorganic lithium salts such as $LiClO_4$, $LiBF_4$, $LiPF_6$, $LiAsF_6$, $LiCl$ and $LiBr$; and organic lithium salts such as $LiB(C_6H_5)_4$, $LiN(SO_2CF_3)_2$, $LiC(SO_2CF_3)_3$, $LiOSO_2CF_3$, $LiOSO_2C_2F_5$, $LiOSO_2C_3F_7$, $LiOSO_2C_4F_9$, $LiOSO_2C_5F_{11}$, $LiOSO_2C_6F_{13}$ and $LiOSO_2C_7F_{15}$.

Examples of the organic solvent for dissolving the lithium salt include cyclic esters, linear esters, cyclic ethers and linear ethers. Specific examples of the cyclic ester include propylene carbonate, butylene carbonate, γ-butyrolactone, vinylene carbonate, 2-methyl-γ-butyrolactone, acetyl-γ-butyrolactone, and γ-valerolactone.

Examples of the linear ester include dimethyl carbonate, diethyl carbonate, dibutyl carbonate, dipropyl carbonate, methylethyl carbonate, methylbutyl carbonate, methylpropyl carbonate, ethylbutyl carbonate, ethylpropyl carbonate, butylpropyl carbonate, alkyl propionates, dialkyl molonates, and alkyl acetates.

Examples of the cyclic ether include tetrahydrofuran, alkyltetrahydrofuran, dialkyltetrahydrofuran, alkoxytetrahydrofuran, dialkoxytetrahydrofuran, 1,3-dioxolane, alkyl-1,3-dioxolane, and 1,4-dioxolane.

Examples of the linear ether include 1,2-dimethoxyethane, 1,2-diethoxyethane, diethyl ether, ethylene glycoldialkyl ether, diethylene glycol dialkyl ether, triehylene glycol dialkyl ether and tetraethylene glycol dialkyl ether.

As described above, the negative electrode coating composition according to the present invention contains a rubber base binder having a glass transition temperature of 0 to 120° C.; therefore, it is possible to form a negative electrode-active layer which is superior in flexibility and adhesiveness to a collector and is not easily exfoliated by a press face at the time of press-working, and further produce, with a high yield, a high-quality negative electrode plate, wherein its active material layer does not fall away or crack very much at the time of fabricating a battery or in the fabricated battery.

In the negative electrode coating composition according to the present invention, two or more rubber base binders having a glass transition temperature of 0 to 120° C. are mixed, using the fact that about the apparent glass transition temperature of any rubber-mixed system, a rough additive property is satisfied. By such mixing, the apparent glass transition temperature of the rubber base binders can be easily and finely optimized. This also makes it possible to improve the quality and productivity of negative electrode plates.

The negative electrode plate according to the present invention is produced using the above-mentioned negative electrode coating composition, and is a high-quality negative electrode plate wherein its active material layer does not fall away or crack easily at the time of bending for the fabrication of a battery or after the plate is set in the battery.

The above-mentioned negative electrode coating composition is used in the method for producing a negative electrode plate according to the present invention; therefore, when its negative active material is press-worked, the exfoliation of the active material layer is not easily caused by the press face. Thus, the yield of the negative electrode can be improved.

In the secondary battery with a nonaqueous electrolyte according to the present invention, its negative electrode plate set inside it does not cause falling-way or crack of the active material layer easily; therefore, the battery is superior in endurance and can stably exhibit a high battery performance over a long time.

EXAMPLES

Example 1

As a carbonaceous material, which would be an active material, there was used a mixture wherein 10% by weight of scaly artificial graphite (available from Petoca Materials Co., Ltd.) was mixed with fibrous graphite (trade name: Melblon-Milled, available from Petoca Materials Co., Ltd.). This active material was mixed with a 1% aqueous solution of CMC (trade name: Celogen EP) and two SBR emulsions, i.e., the first SBR emulsion (#0640 available from JSR Co., Ltd., Tg=55° C.) and the second SBR emulsion (#0693 available from JSR Co., Ltd., Tg=20° C.) as binders, and the mixture was kneaded to yield a slurry-form negative electrode coating composition. The weight ratio of the active material/CMC/the first SBR (#0640)/the second SBR (#0693) was set to 98/1/0.4/0.6.

This negative electrode coating composition was applied onto a copper foil, which would be a collector, by a comma direct method such that the applied amount would be about 100 g/m². After drying the composition, the composition was pressed at a line pressure of 0.4 to 0.6 tf/cm by means of a roll-press machine. As a result, a homogeneous negative electrode-active material layer having a density of 1.68 to 1.72 g/cc was formed without the active material layer adhering to the press face of the roll.

Comparative Example 1

A slurry-form negative electrode coating composition was yielded in the same way as in Example 1 except that the SBR emulsions in Example 1 were replaced by an SBR emulsion in a single grade having a low Tg (trade name: BM-400B, available from ZEON CORPORATION, Tg=−5° C.). This negative electrode coating composition was applied onto a collector, dried and subjected to roll-press in the same way as in Example 1. As a result, at a density of 1.72 g/cc, the exfoliation of the active material layer was intermittently caused by the press face. Thus, the press-working was unable to be stably performed. The density of the coating layer was lowered to 1.50 g/cc to perform roll-press. However, the exfoliation of the active material layer was unable to be prevented.

Comparative Example 2

A slurry-form negative electrode coating composition was yielded in the same way as in Example 1 except that all of the SBR emulsions in Example 1 were replaced by the first SBR emulsion (#0640 available from JSR Co., Ltd., Tg=55° C.). This negative electrode coating composition was applied onto a collector, dried and subjected to roll-press in the same way as in Example 1. As a result, at any density of 1.68 to 1.72 g/cc, the press was possible. However, the adhesiveness of the active material layer lowered slightly as compared with Example 1.

Comparative Example 3

A slurry-form negative electrode coating composition was yielded in the same way as in Example 1 except that all of the SBR emulsions in Example 1 were replaced by the second SBR emulsion first SBR emulsion (#0693 available from JSRCo., Ltd., Tg=20° C.) This negative electrode coating composition was applied onto a collector, dried and subjected to roll-press in the same way as in Example 1. As a result, at any density of 1.38 to 1.72 g/cc, the press was possible. Occasionally, however, the exfoliation of the active material layer broke out suddenly. Thus, the press-working was slightly unstable.

(Evaluation of Charging and Discharging Performance)

Each of the negative electrode plates obtained in Example 1 and Comparative Examples was used to fabricate a coin-shaped cell, and then the charging and discharging performance thereof was evaluated. In Comparative Examples, as their negative electrode, a portion where no exfoliation of the active material layer was caused was used. The discharge capacity of each of the fabricated coin-shaped cells was about 338 mAh/g in a first cycle. Thus, no difference in drop in the capacity was observed dependently on the difference in SBR between the cells.

What is claimed is:

1. A coating composition for a negative electrode-active material layer, comprising an active material for a negative electrode, and two or more rubber base binders selected from rubber base binders having a glass transition temperature of 0 to 120° C.

2. A coating composition for a negative electrode-active material according to claim 1, wherein the rubber base binders are contained at a ratio of 0.5 to 10% by weight of the amount of ingredients other than a solvent.

3. A coating composition for a negative electrode-active material layer according to claim 2, wherein the rubber base binders are contained at a ratio of 0.5 to 7% by weight of the amount of the ingredients other than the solvent, and further a thickener is contained at a ratio of 0.5 to 3% by weight thereof.

4. A coating composition for a negative electrode-active material layer according to claim 1, wherein as the rubber base binders, two or more styrene-butadiene rubbers are used.

5. A negative electrode plate for a secondary battery with a nonaqueous electrolyte comprising a collector and a negative electrode-active material layer disposed on the collector, wherein the negative electrode-active material layer comprises an active material for a negative electrode and two or more rubber base binders selected from rubber base binders having a glass transition temperature of 0 to 120° C.

6. A negative electrode plate for a secondary battery with a nonaqueous electrolyte according to claim 5, wherein the negative electrode-active material layer contains 0.5 to 10% by weight of the rubber base binders.

7. A negative electrode plate for a secondary battery with a nonaqueous electrolyte according to claim 6, wherein the negative electrode-active material layer contains 0.5 to 7% by weight of the rubber base binders, and further contains 0.5 to 3% by weight of a thickener.

8. A negative electrode plate for a secondary battery with a nonaqueous electrolyte according to claim 5, wherein as the rubber base binders, two or more styrene-butadiene rubbers are used.

9. A negative electrode plate for a secondary battery with a nonaqueous electrolyte according to claim 5, wherein the density of the negative electrode-active material layer is 1.5 g/cc or more.

10. A method for producing a negative electrode plate for a secondary battery with a nonaqueous electrolyte comprising:

provipding a collector having dispersed thereon a negative electrode-active material layer comprising an active material, and two or more rubber base binders selected from rubber base binders having a glass transition temperature of 0 to 120° C.; and press-working the negative electrode-active material layer.

11. The method for producing a negative electrode plate for a secondary battery with a nonaqueous electrolyte according to claim 10, wherein as the rubber base binder, two or more styrene-butadiene rubbers are used.

12. The method for producing a negative electrode plate for a secondary battery with a nonaqueous electrolyte according to claim 10, wherein roll-press is performed as the press-working.

13. The method for producing a negative electrode plate for a secondary battery with a nonaqueous electrolyte according to claim 10, wherein the temperature of the pressing is set to room temperature.

14. A secondary battery with a nonaqueous electrolyte, which is provided with a negative electrode plate, wherein a negative electrode-active material layer comprising an active material for a negative electrode and two or more rubber base binders selected from rubber base binders having a glass transition temperature of 0 to 120° C. is disposed on a collector.

* * * * *